United States Patent [19]

Vydra et al.

[11] Patent Number: 5,851,342
[45] Date of Patent: Dec. 22, 1998

[54] METHOD AND APPARATUS FOR FORMING A LAMINATE

[75] Inventors: Edward J. Vydra, Northbrook; Timothy A. Brinner, Elmhurst; Mark R. Monterastelli, Park Ridge, all of Ill.; Richard M. Hansen, Oshkosh, Wis.

[73] Assignee: Material Sciences Corporation, Elk Grove Village, Ill.

[21] Appl. No.: 746,673

[22] Filed: Nov. 14, 1996

[51] Int. Cl.$^6$ ........................... B29C 65/48; B32B 31/08; B32B 31/20
[52] U.S. Cl. ............................ 156/324; 156/580
[58] Field of Search .................................. 156/324, 580, 156/583.1

[56] References Cited

U.S. PATENT DOCUMENTS

| | | | |
|---|---|---|---|
| 3,096,145 | 7/1963 | Carnaut | 156/242 X |
| 3,223,027 | 12/1965 | Soda et al. | 156/324 X |
| 4,353,776 | 10/1982 | Giulie et al. | 156/555 |
| 4,466,857 | 8/1984 | Pfeiffer | 156/583.5 |
| 4,609,100 | 9/1986 | Fudickar et al. | 156/580 X |
| 4,670,080 | 6/1987 | Schwarz et al. | 156/307.5 |
| 4,909,886 | 3/1990 | Noguchi | 158/285 |
| 4,927,479 | 5/1990 | Böck | 156/228 |
| 4,997,507 | 3/1991 | Meyer | 156/286 |
| 5,087,319 | 2/1992 | Held | 156/555 |
| 5,158,641 | 10/1992 | Vermeulen et al. | 156/555 |
| 5,378,304 | 1/1995 | Denker | 156/555 |
| 5,437,760 | 8/1995 | Benkowski et al. | 156/580 |

*Primary Examiner*—Francis J. Lorin
*Attorney, Agent, or Firm*—Emrich & Dithmar

[57] ABSTRACT

An apparatus and a method for bonding a laminate formed of at least two layers of sheet material superimposed on one another with adhesive therebetween and moved along a path. The apparatus includes a first laminator having an upper plate assembly having a first low-friction laminate-contacting surface for contacting a first layer of the laminate, and an upper heat exchanger thermally coupled to the upper plate assembly. The first laminator also includes a lower plate assembly having a second low-friction laminate-contacting surface for contacting a second layer of the laminate, wherein the first and second laminate-contacting surfaces are disposed in opposed relationship for accommodating passage of the layers of the laminate therebetween, and a lower heat exchanger thermally coupled to the lower plate assembly. The first laminator further includes a drive member coupled to at least one of the laminate-contacting surfaces for varying the distance between the surfaces to apply pressure to the layers of the laminate. The apparatus may also include a second laminator downstream of the first laminator and substantially identical to the first laminator. The heat exchangers of the first and second laminators can both be used for heating or cooling, or one for cooling and one for heating, depending upon the application.

25 Claims, 3 Drawing Sheets

METHOD AND APPARATUS FOR FORMING A LAMINATE

BACKGROUND OF THE INVENTION

1. Field of the Invention

The present invention relates to methods and apparatus for forming laminates and, in particular, to methods and apparatus for bonding and forming laminates with a hot melt adhesive.

2. Description of the Prior Art

Apparatus to combine and bond layers of sheet material together to form a laminate typically include high-pressure rollers between which the layers of sheet material with adhesive therebetween are combined and compressed. This type of apparatus suffers from several problems if the adhesive is a hot melt adhesive.

First, for a hot melt adhesive to properly form a bond with the layers of sheet material, it must both be heated to a liquid and then cooled to a solid while it is still in contact with the layers of sheet material to be bonded together.

Though high pressure rollers can supply the required pressure to combine the layers, the rollers are usually located close to the heat source needed to melt the hot melt adhesive and the layers are only in contact with these rollers for a very small period of time. The time it takes for the layers with the melted adhesive to travel between the heat source and the rollers and the residence time that the layers are in contact with the rollers is not enough to properly cool the adhesive while it is in contact with the layers. Therefore, the layers often come apart or delaminate after they pass through the pressure rolls.

There have also been laminating apparatus that cool the layers of laminate under pressure after they have been combined. This pressure is usually applied by superimposed upper and lower moving belt presses. These belt presses, however, can exert difficult frictional forces on different layers of the laminate. If these belts are not perfectly aligned along a common path with one another they tend to move the different laminate layers they are in contact with in different directions, causing the laminate layers to separate. These belt presses must be constantly realigned with one another to prevent this separation. This requires excess labor and apparatus down time.

SUMMARY OF THE INVENTION

It is a general object of the invention to provide an improved laminator which avoids the disadvantages of prior laminators while affording additional structural and operational advantages.

An important feature of the invention is the provision of an apparatus for bonding laminate layers together which is of a relatively simple and economical construction.

A still further feature of the invention is the provision of an apparatus of the type set forth which utilizes materials with low coefficients of friction to maintain the laminate layers together while they are being bonded which aids in preventing delamination.

Yet another feature of the invention is the provision of an apparatus of the type set forth which requires very little maintenance.

These and other features of the invention are attained by providing an apparatus and a method for bonding a laminate formed of at least two layers of sheet material superimposed on one another moved along a path with adhesive therebetween. The apparatus includes an upper plate assembly having a first low-friction laminate-contacting surface for contacting a first layer of the laminate, and an upper heat exchanger thermally coupled to the upper plate assembly. The apparatus also includes a lower plate assembly having a second low-friction laminate-contacting surface for contacting a second layer of the laminate, wherein the first and second laminate-contacting surfaces are disposed in opposed relationship for accommodating passage of the layers of the laminate therebetween, and a lower heat exchanger thermally coupled to the lower plate assembly. The apparatus further includes a drive member coupled to at least one of the laminate-contacting surfaces for varying the distance therebetween to apply pressure to the layers of the laminate.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
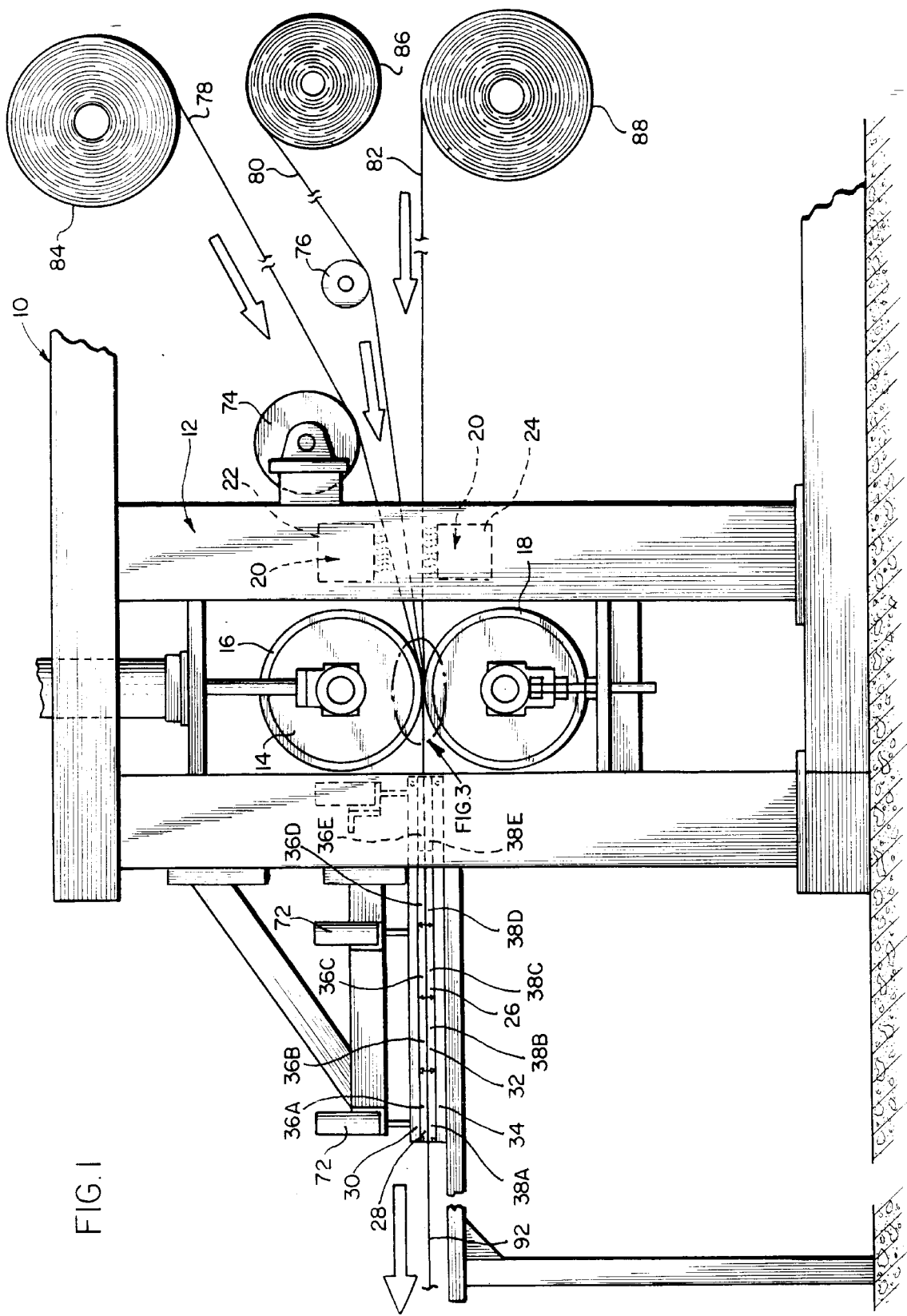
FIG. 1 is a fragmentary side elevational view of an apparatus to form and bond a laminate in accordance with the invention.

Referring to FIGS. 1–6, a laminating apparatus 10 is illustrated. The laminating apparatus 10 includes a frame 12. Disposed on the frame 12 is a nip roll 14 which includes an upper pressure roller 16 and a lower pressure roller 18.

Also, as seen best in FIG. 1, disposed on the frame 12 is a conventional heating apparatus 20 which includes upper and lower heating elements 22, 24.

Figure 2:
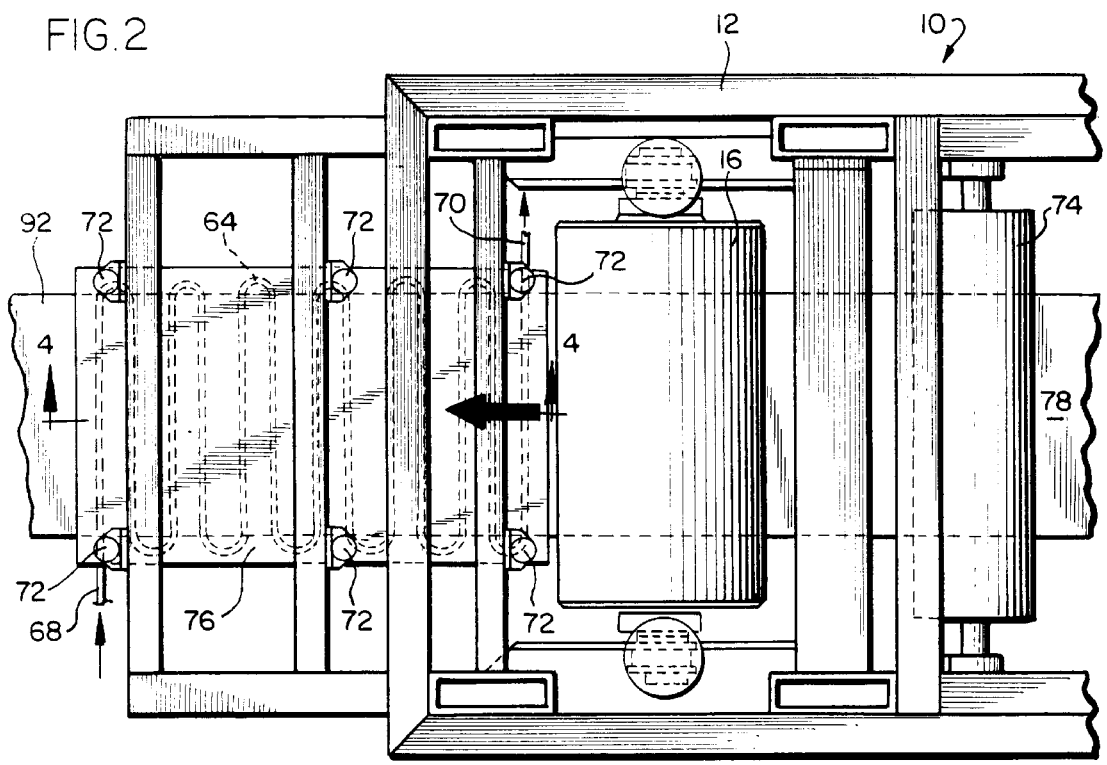
FIG. 2 is a fragmentary, top plan view of the apparatus of FIG. 1.
Figure 4:
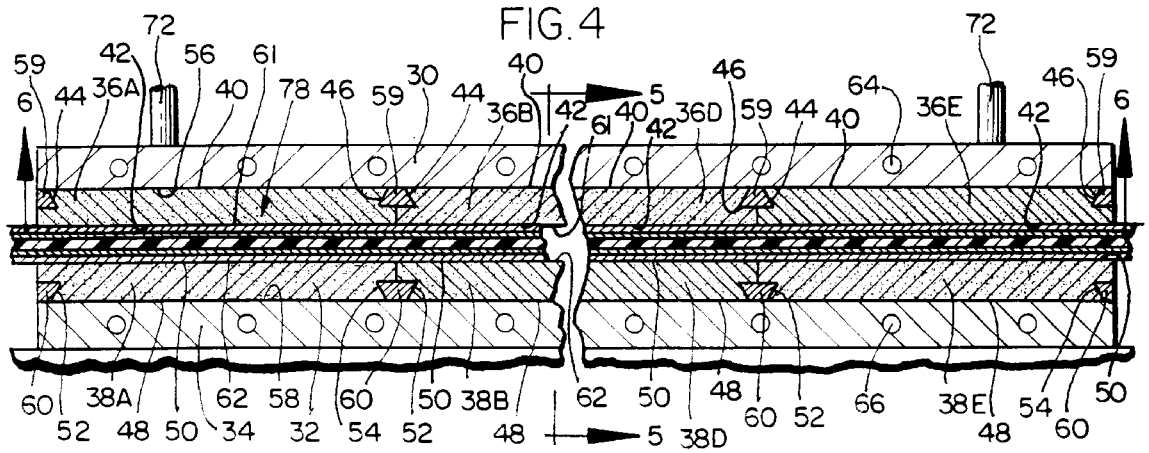
FIG. 4 is a sectional view taking generally along line 4—4 of FIG. 2.
Figure 5:
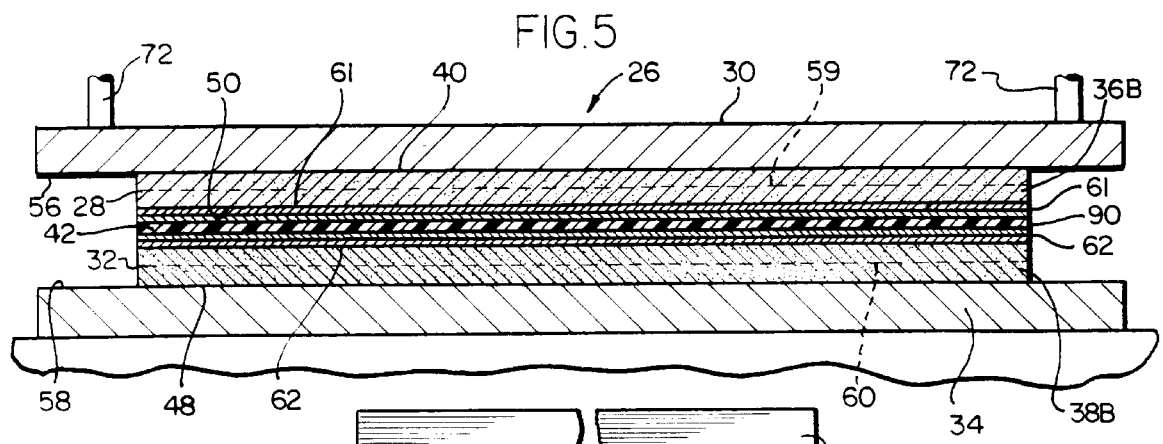
FIG. 5 is a sectional view taking generally along line 5—5 of FIG. 4.
Figure 6:
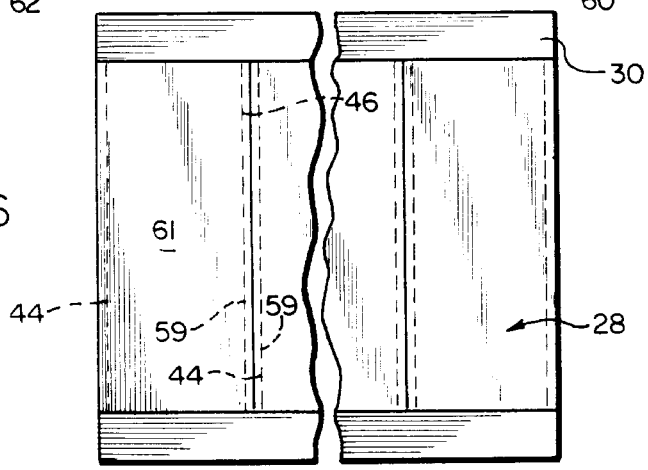
FIG. 6 is a fragmentary bottom plan view of the upper plate assembly and upper heat exchanger of the apparatus of FIG. 1, taken along line 6—6 in FIG. 4.

Also attached to the frame 12 is a block laminator 26. As best seen in FIGS. 2, 4 and 5, the block laminator 26 includes an upper plate assembly 28 physically and thermally coupled to an upper heat exchanger 30 and a lower plate assembly 32 physically and thermally coupled to a lower heat exchanger 34.

The upper plate assembly 28 has five plates 36A–E, and the lower plate assembly 32 has five plates 38A–E. The plates 36A–E of the upper plate assembly 28 are identical and each has a heat exchanger-contacting surface 40, a laminate-contacting surface 42, and two V-shaped slots 44, 46 along its length (see FIG. 6) and at its respective heat exchanger-contacting surface 46. Similarly, each plate 38A–E of the lower plate assembly 32 is identical and respectively has a heat exchanger-contacting surface 48, a laminate-contacting surface 50 and two V-shaped slots 52, 54 along its length and at its respective heat exchanger-contacting surface 48.

The upper and lower heat exchangers 30, 32 respectively have plate contacting surfaces 56, 58 and six connectors 59, 60 projecting from the plate contacting surfaces 56, 58. The connectors 59, 60 are mateable with the V-shaped slots 44, 46, 52, 54 to respectively couple plates 36A–E, 38A–E to the upper and lower heat exchangers 30, 34. The connectors 59, 60 are all not identical. The connectors 59, 60 on the ends are shaped to mate with only one slot 44, 46, 52, 54 of a plate 36A–E, 38A–E. The inner connectors 59, 60 are designed to mate with two slots, one slot from one plate and another slot from an adjacent plate.

The laminate-contacting surfaces 42 of the plates 56A–E of the upper plate assembly 28 and the laminate-contacting surfaces 50 of the plates of the lower plate assembly 32 respectively form a substantially continuous upper laminate-contacting surface 61 and a substantially continuous lower laminate-contacting surface 62. The upper and lower laminate-contacting surfaces 61, 62 are, as discussed below, in opposed relationship for accommodating passage of the layers of a laminate therebetween.

As discussed in further detail below, the upper laminate-contacting surface 61 and the lower laminate-contacting surface 62 are designed to apply only small frictional forces to laminate materials which pass therebetween. Preferably, the dry sliding coefficient of friction of stainless steel on each of the upper laminate-contacting surface 61 and the lower laminate-contacting surface 62 is less than about 0.30 and is preferably in the range of from about 0.14 to about 0.17.

Though many methods and devices can be used to determine the dry sliding coefficient of friction of stainless steel on a flat surface, one such device is the TECH Model 9505A Mobility/Lubricant Tester (utilizing a TECH 9793A change part) made by Altek Company of Torrington, Conn.

Also, all of the plates 36A–E, 38A–E have a thermal conductivity of at least about 75 Watts/meter°C. (W/°C.), preferably 150 W/m°C. and a melting point above about 600° F. Preferably, all of the plates 36A–E, 38A–E are comprised of a graphite material which may include a binder, such as Grade 10 amorphous graphite sold by Graphite Engineering & Sales Co. of Greenville, Mich.

Both of the upper and lower heat exchangers 30, 34 are preferably comprised of a metal having a high thermal conductivity, preferably above about 200 W/m°C. Most preferably, above about 400° W/m°C. Preferably the upper and lower heat exchangers 30, 34 are formed of copper.

The upper and lower heat exchangers 30, 34 may respectively be used for cooling the upper and lower laminate-contacting surfaces 61, 62. As best seen in FIGS. 2 and 4, the upper and lower heat exchangers 30, 40 respectively have passageways 64, 66 for passing coolant therethrough. Passageways 64, 66 are substantially identical and only passageway 64 will be discussed. Passageway 64 has an inlet 68 connected to a coolant source, such as a cold water tap, and an outlet 70.

As seen best in FIGS. 1, 2, 4 and 5, the upper heat exchanger 30 is connected to a plurality of drive mechanisms, or air cylinders 72. The air cylinders 72 are able to raise and lower the upper heat exchanger 30 and the coupled upper plate assembly 28 to vary the distance between the upper and lower laminate-contacting surfaces 61, 62 and to apply varying amounts of pressure to the layers of the laminate that pass therebetween.

The laminating apparatus 10 also includes a guide roller 74 attached to the frame 12 and a guide roller 76, each for properly guiding layers of sheet material to the nip roll 14 for forming the laminate.

Figure 3:
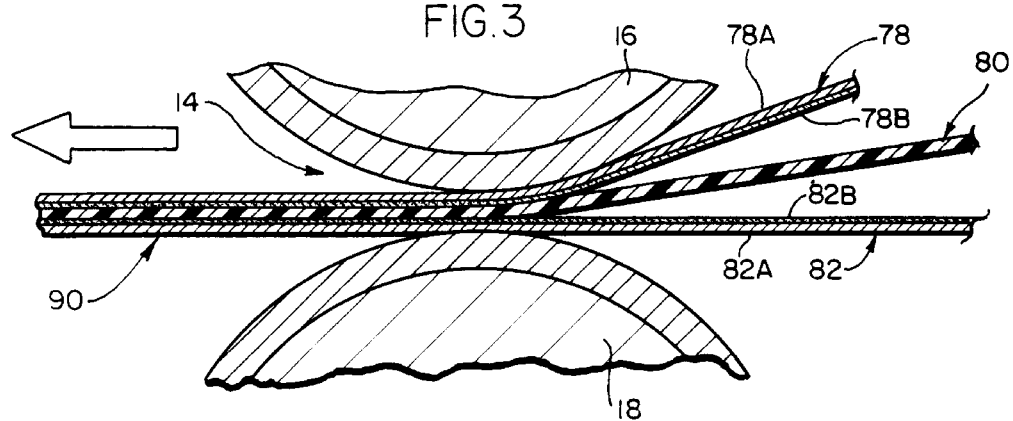
FIG. 3 is an enlarged, fragmentary sectional view of the high pressure rollers of the apparatus of FIG. 1 for combining and compressing the sheet layers forming the laminate.

A laminate is formed using the laminating apparatus 10 as follows. Layers 78, 80, 82 of sheet material are fed respectively from supply rolls 84, 86, 88 along a path in the direction of the arrows shown in FIGS. 1–3. First, layers 78, 80, 82 are fed toward the nip roll 14 with layer 78 and layer 80 being guided respectively thereto by guide rolls 74, 76. Layer 78 and layer 82 may each be comprised of, as seen in FIG. 3, a metal layer 78A, 82A and a hot melt adhesive layer 78B, 82B bonded thereto by conventional means. Hot melt adhesive layers 78B, 82B can be formed of an ionomer resin, such as those sold by E.I. du Pont de Nemours & Co. under the tradename Surlyn 1605. Layer 80 can be a plastic material or almost any other material that may provide the particular characteristics or properties needed for the laminate, such as thermal or sound insulation properties, vibration dampening properties or strengthening properties.

Prior to reaching the nip roll 14, the metal layers 78A, 82A are respectively heated by the upper heating element 22 and the lower heating element 24, which causes the hot melt adhesive layers 78B, 82B to melt. Depending upon the application, the upper and lower heating elements 22, 24 may heat the metal layers 78A, 82A up to about 600° F. Immediately after heating, the layers 78, 80 and 82 are combined at the nip roll 14 under high pressure, such as 100 psi, while the hot melt adhesive layers 78B, 82B are still in the liquid state. This pressure causes the melted adhesive to thoroughly coat the metal layers 78, 82 and both sides of layer 80.

After layers 78, 80 and 82 are combined at the nip roll 14, a composite 90 is formed. The composite 90 is then fed to the block laminator 26 while the hot melt adhesive layers 78B, 82B are still liquid. As discussed above, a hot melt adhesive must both be heated to a liquid and then cooled to a solid while it is still in contact with the layers of sheet material to be bonded together. Because the hot melt adhesive layers 78B and 82B have not had time to cool and solidify to form a bond between metal layers 78A, 82A and layer 80, the block laminator 26 is located as close as possible to the nip roll 14 to prevent delamination.

The composite 90 is then fed through the block laminator 26 with the metal layers 78A, 82A respectively in contact with the upper laminate-contacting surface 61 and the lower laminate-contacting surface 62. The block laminator 26 applies pressure to the composite 90 to maintain the layers of the composite 90 together at the same time it cools the hot melt adhesive layers 78B, 82B for bond formation. Depending upon the application, via use of the air cylinders 82, block laminator 26 can apply different amounts of pressure to the layers of the composite 90 thereon. For example, the air cylinders 72 can apply no force to the upper heat exchanger 30, so that the only pressure applied to the composite 90 is substantially due the weight of the upper plate assembly 28 and upper heat exchanger 30, or the air cylinders 72 can conventionally apply a force on the upper heat exchanger 30 so that a greater force is applied to the composite.

Since the upper and lower plate assemblies 28, 32 are made of a material with a high thermal conductivity, the coolant being passed through the upper and lower heat exchangers 30, 34 is efficiently able to cool the hot melt adhesive layers 78B, 82B to complete the bond formation. Also, since the upper and lower laminate-contacting surfaces 61, 62 are stationary with respect to the movement of the composite 90 and are capable of only applying small frictional forces, the pressure exerted by the block laminator 26 on the metal layers 78A, 82A of the composite 90 does not create a significant frictional force between either the metal layer 78A and the upper laminate-contacting surface 61 or the metal layer 82A and the lower laminate-contacting surface 62 to cause the metal layers 78A, 82A to move in different directions to cause delamination. Further, since the upper plate assembly 28 and lower plate assembly 30 are comprised of materials having a melting point above 600° F., they are not harmed or melted by the hot metal layers 78A, 82A contacting them.

As just discussed, prior to exiting the block laminator 26, the hot melt adhesive layers 78B, 82B solidify to form a bond between the layers of the composite 90 to form a laminate 92. The laminate 92 is then pulled and collected into a pick up roll (not shown) in a conventional manner.

Figure 7:
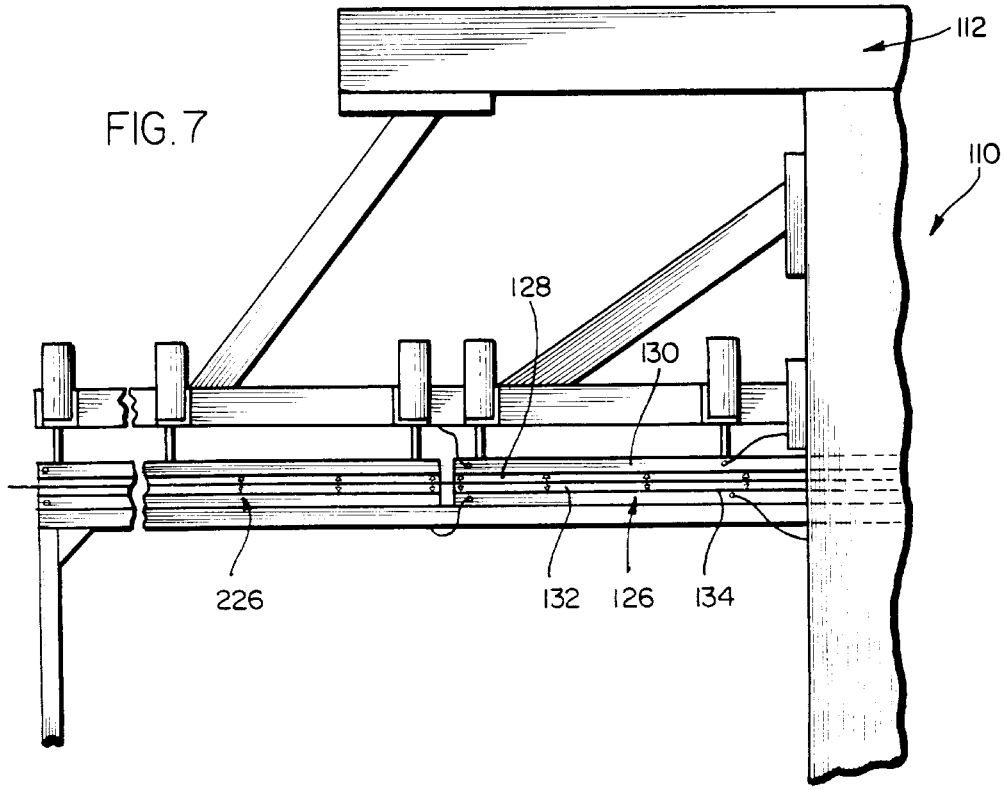
FIG. 7 is a fragmentary, side elevational view of an apparatus for bonding and forming a laminate in accordance with another embodiment of the present invention.

Referring to FIG. 7, a portion of a laminating apparatus 110, in accordance with a second embodiment of the present invention, is illustrated. The laminating apparatus 110 is identical to the laminating apparatus 10 of FIGS. 1–6, except that it includes two block laminators 126, 226 and a modified frame 112 to accommodate the two block laminators 126, 226.

Block laminator 126, like block laminator 26 of FIGS. 1–6, is disposed immediately downstream of the nip roll and is identical to block laminator 26 except that it includes an upper heat exchanger 130 and a lower heat exchanger 134 connected to a conventional heating source rather than a cooling source.

The upper and lower heat exchangers 130, 134 provide heat to the layers of the laminate that pass between the upper and lower plate assemblies 128, 132 respectively coupled to the upper and lower heat exchangers 130, 134. Block laminator 126 is especially useful when a laminate is formed with an adhesive that requires heating for an additional time (in addition to the heat supplied by the heating apparatus upstream of the nip roll) for further curing.

Block laminator 226 is disposed immediately downstream of block laminator 126 and is identical to block laminator 26 of FIGS. 1–6. Like block laminator 26, block laminator 126 maintains the layers of the composite together under pressure while cooling the adhesive used to a solid to form the necessary bonding.

Depending upon the application, both block laminators 126, 226 could be designed to provide heat to the laminate layers or both could be designed to cool the laminate layers. Additional block laminators could also, if necessary, be located downstream of the block laminator 226.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for continuously bonding a laminate formed of at least two layers of sheet material superimposed on one another with adhesive therebetween and moved along a path, the apparatus comprising:

an upper plate assembly having a first low-friction laminate-contacting surface for contacting a first layer of the laminate while the laminate moves along the path;

an upper heat exchanger thermally coupled to the upper plate assembly and having a thermal conductivity greater than that of the upper plate assembly;

a lower plate assembly having a second low-friction laminate-contacting surface for contacting a second layer of the laminate while the laminate moves along the path, wherein the first and second laminate-contacting surfaces are disposed in opposed relationship for accommodating passage of the layers of the laminate therebetween and relative thereto along the path; and a lower heat exchanger thermally coupled to the lower plate assembly and having a thermal conductivity greater than that of the lower plate assembly;

the laminate-contacting surfaces being disposed to apply pressure to the layers of the laminate.

2. The apparatus of claim 1, wherein the upper and lower plate assemblies are comprised of graphite.

3. The apparatus of claim 1, wherein the dry sliding coefficient of friction of stainless steel on each of the first and second laminate-contacting surfaces is less than about 0.30.

4. The apparatus of claim 3, wherein each of the upper and lower plate assemblies is comprised of material having a thermal conductivity of at least about 75 W/m°C.

5. The apparatus of claim 1, and further comprising pressure rollers disposed upstream of the upper and lower plate assemblies for applying high pressure to the layers of the laminate when it passes between the rollers.

6. The apparatus of claim 5, and further comprising a heater assembly for heating the adhesive, the heater assembly being disposed upstream of the rollers.

7. The apparatus of claim 1, wherein the upper and lower heat exchangers are coupled to a cooling assembly, whereby the upper and lower heat exchangers respectively cool the first and second laminate-contacting surfaces to cool the adhesive of the laminate below its melting temperature.

8. The apparatus of claim 7, wherein each of the upper and lower heat exchangers comprises a metal plate having a thermal conductivity of at least about 200 W/m°C. and a passageway to carry coolant therethrough.

9. The apparatus of claim 8, wherein the metal plates of the upper and lower heat exchangers are comprised of copper.

10. The apparatus of claim 1, wherein the upper and lower heat exchangers are coupled to a heating assembly, whereby the upper and lower heat exchangers respectively heat the first and second laminate-contacting surfaces to heat the adhesive of the laminate.

11. The apparatus of claim 1, and further comprising a drive member coupled to at least one of the laminate-contacting surfaces for varying the distance between the surfaces.

12. The apparatus of claim 11, wherein the first and second laminate-contacting surfaces are substantially parallel to a common plane and are movable only in directions substantially perpendicular to said plane.

13. Apparatus for continuously bonding a laminate formed of at least two layers of sheet material superimposed on one another with adhesive therebetween and moved along a path, the apparatus comprising:

a first laminator including a first upper plate assembly having a first low-friction laminate-contacting surface for contacting a first layer of the laminate while the laminate moves along the path, a first upper heat exchanger thermally coupled to the first upper plate assembly and having a thermal conductivity greater than that of the first upper plate assembly, a first lower plate assembly having a second low-friction laminate-contacting surface for contacting a second layer of the laminate while the laminate moves along the path, wherein the first and second laminate-contacting surfaces are disposed in opposed relationship for passage of the layers of the laminate therebetween and relative thereto along the path, and a first lower heat exchanger thermally coupled to the first lower plate assembly and having a thermal conductivity greater than that of the first lower plate assembly, the first and second laminate-contacting surfaces being disposed to apply pressure to the layers of the laminate; and a second laminator disposed downstream of the first laminator; including a second upper plate assembly having a third low-friction laminate-contacting surface for contacting the first layer of the laminate while the laminate moves along the path, a second upper heat exchanger thermally coupled to the second upper plate and having a thermal conductivity greater than that of the second upper plate assembly, a second lower plate assembly having a fourth low-friction laminate-contacting surface for contacting the second layer of the laminate while the laminate moves along the path, wherein the third and fourth laminating surfaces are disposed in opposed relationship for passage of the layers of the laminate therebetween and relative thereto along the path, and a second lower heat exchanger thermally coupled to the second lower plate assembly and having a thermal conductivity greater than that of the second lower plate assembly, the third and fourth laminate-contacting surfaces being disposed to apply pressure to the layers of the laminate.

14. The apparatus of claim 13, wherein the first upper and first lower heat exchangers are coupled to a heating assembly, whereby the first upper and the first lower heat exchangers respectively heat the first and second laminate-contacting surfaces to heat the adhesive of the laminate, and wherein the second upper and the second lower heat exchangers are coupled to a cooling assembly, whereby the second upper and the second lower heat exchangers respectively cool the third and fourth laminate-contacting surfaces to cool the adhesive of the laminate below its melting temperature.

15. The apparatus of claim 13, wherein the first upper, the first lower, the second upper and the second lower plate assemblies are comprised of graphite.

16. The apparatus of claim 13, wherein each of the first upper, the first lower, the second upper and the second lower plate assemblies is comprised of a plurality of low-friction plates.

17. The apparatus of claim 13, and further comprising pressure rollers disposed upstream of the first upper and first lower plate assemblies for applying high pressure to the layers of the laminate when they pass between the rollers.

18. The apparatus of claim 17, and further comprising a heater assembly for heating the adhesive, the heater assembly being disposed upstream of the rollers.

19. The apparatus of claim 3, wherein each of the upper and lower plate assemblies has a thermal conductivity of at least about 150 W/m°C.

20. The apparatus of claim 13, wherein the dry sliding coefficient of friction of stainless steel on each of the first, second, third and fourth laminate-contacting surfaces is less than about 0.30.

21. The apparatus of claim 20, wherein each of the first and second upper and first and second lower plate assemblies has a thermal conductivity of at least about 75 W/m°C.

22. The apparatus of claim 20, wherein each of the first and second upper and first and second lower plate assemblies has a thermal conductivity of at least about 150 W/m°C.

23. A method of continuously producing a laminate comprising:

disposing an adhesive material between first and second sheets of laminate material;

heating the adhesive material to melt the adhesive;

joining the first and second sheets with the melted adhesive to form a composite;

continuously moving the composite along a path relative to and through a pressurizing space defined by upper and lower laminate-contacting surfaces of upper and lower plate assemblies, respectively, the upper and lower plate assemblies respectively thermally coupled to upper and lower heat exchangers, the upper and lower plate assemblies each having a thermal conductivity lower than the upper and lower heat exchangers, respectively, the upper and lower contacting surfaces each having a low coefficient of friction; and maintaining the parts of the composite joined together between the upper and lower laminate-contacting surfaces while cooling the adhesive to a solid, whereby the adhesive bonds to the first and second sheets to form the laminate.

24. The method of claim 23, wherein the joining includes passing the first sheet, the second sheet and the adhesive through a pair of pressure rolls.

25. The method of claim 23, and wherein the heating step includes heating the adhesive between the upper and lower surfaces prior to cooling the adhesive therebetween.

* * * * *